United States Patent
Park et al.

(10) Patent No.: US 9,257,856 B2
(45) Date of Patent: Feb. 9, 2016

(54) WIRELESS POWER TRANSMITTER AND METHOD OF CONTROLLING THE SAME

(71) Applicant: Samsung Electronics Co., Ltd., Gyeonggi-do (KR)

(72) Inventors: Se-Ho Park, Gyeonggi-do (KR); Sung-Bum Park, Gyeonggi-do (KR); Sung-Ku Yeo, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 459 days.

(21) Appl. No.: 13/659,471

(22) Filed: Oct. 24, 2012

(65) Prior Publication Data

US 2013/0099733 A1 Apr. 25, 2013

Related U.S. Application Data

(60) Provisional application No. 61/550,696, filed on Oct. 24, 2011.

(51) Int. Cl.
*H02J 7/00* (2006.01)
*H02J 7/02* (2006.01)

(52) U.S. Cl.
CPC ............. *H02J 7/0034* (2013.01); *H02J 7/025* (2013.01); *H02J 7/0004* (2013.01)

(58) Field of Classification Search
USPC ............................................. 320/108
See application file for complete search history.

(56) References Cited

U.S. PATENT DOCUMENTS

| | | | | |
|---|---|---|---|---|
| 4,031,449 | A * | 6/1977 | Trombly | 320/108 |
| 5,536,979 | A * | 7/1996 | McEachern et al. | 307/104 |
| 2010/0277120 | A1 | 11/2010 | Cook et al. | |
| 2010/0279606 | A1 | 11/2010 | Hillan et al. | |

* cited by examiner

*Primary Examiner* — Samuel Berhanu
(74) *Attorney, Agent, or Firm* — The Farrell Law Firm, P.C.

(57) ABSTRACT

A method and a wireless power transmitter for transmitting charging power to a wireless power receiver are provided. The method includes applying the charging power to the wireless power receiver; determining whether a current value of the charging power is greater than a predetermined threshold; and driving the overcurrent protection circuit upon a determination that the current value of the charging power is greater than the predetermined threshold.

11 Claims, 8 Drawing Sheets

WIRELESS POWER TRANSMITTER AND METHOD OF CONTROLLING THE SAME

PRIORITY

This application claims priority under 35 U.S.C. §119(e) to a Provisional U.S. Patent Application filed in the USPTO on Oct. 24, 2011, and assigned Ser. No. 61/550,696, the entire content of which is incorporated herein by reference.

BACKGROUND OF THE INVENTION

1. Field of the Invention

The present invention relates generally to a wireless power transmitter and method of controlling the same, and more particularly, to a wireless power transmitter for transmitting charging power to a wireless power receiver and method of controlling the same.

2. Description of the Related Art

Mobile terminals, such as cell phones, Personal Digital Assistants (PDAs), etc., are powered by rechargeable batteries, and in order to recharge the batteries, the terminals supply electric energy to the batteries via separate charging devices. Typically, the charging device and the battery each having contacting terminals on their respective outer surfaces, and are electrically connected to each other via their contacting terminals.

However, when using such a contact charging method, the contacting terminals are susceptible to be contaminated by dirt because they extend outward, thus suffering from inappropriate charging. Also, they may not be properly charged when exposed to moisture.

To address these problems, wireless charging or contactless charging technologies have recently been developed and applied to many different electronic devices.

A wireless charging technology using wireless power transmission and reception enables, for example, a battery of a cell phone to be automatically charged just by placing the cell phone on a charging pad without a need of a separate charging connector. Such technology is currently applied to wireless electric toothbrushes or wireless electric shaver. From the wireless charging technology, the electronic device may benefited from enhanced waterproof and portable functions because of the lack of need for a wired charging device. And in the coming era of electric vehicles, various relevant technologies are expected to be even further developed.

The wireless charging technology has an electromagnetic induction method using coils, a resonance method using resonance, and a Radio Frequency (RF)/micro wave radiation method that converts electric energy into microwaves for transmission.

Although wireless charging technology has thus far been dominated by the electromagnetic induction method, due to recent successful experiments in microwave-based wireless transmission from distances of a few tens of meters between devices, it is foreseeable that, in the near future, all electronic products may be wirelessly recharged anywhere and anytime.

A power transmission method based on the electromagnetic induction transfers power between primary and secondary coils. Movement of a magnet through a coil produces an induced current based on which a magnetic field is produced at the transmission end, and the change in the magnetic field at a receiving end induces a current to generate energy. This phenomenon is referred to as magnetic induction, and power transmission methods based on the magnetic induction provide superior energy transmission efficiency.

In a resonance method for wireless charging, a professor Soljacic of the Massachusetts Institute of Technology (MIT) suggested a system in which electricity is delivered wirelessly, even when the system is a few meters away from a charging device, using a resonance-based power transmission principle based on Coupled Mode Theory. The MIT team's wireless charging system is based on the resonance effect, a physical concept where a tuning fork being placed next to a wine glass causes the wine glass to ring with the same frequency. In the resonance method electromagnetic waves carrying the electric energy are resonated instead of sound. Resonant electric energy of electromagnetic waves is directly transferred only when there is a device having the same resonant frequency, and the non-used part of the energy is reabsorbed into the magnetic field rather than being dispersed in the air, and thus the resonant electric energy has not been found to be harmful to surrounding machines or bodies.

A user may arrange the wireless power receiver and the wireless power transmitter in various locations relative to each other. In this case, impedance at a particular point of the wireless power transmitter may rapidly change. Such a change in impedance may cause overcurrent to be supplied to the wireless power transmitter. The overcurrent makes operations of an amplifier in the wireless power transmitter unstable. Furthermore, the overcurrent may cause destroying the power source itself due to fire resulting from an excessive current supply.

SUMMARY OF THE INVENTION

Therefore, the present invention has been made to solve the above-mentioned problems occurring in the prior art, and provide the advantages and improvements as will be described below. Accordingly, the present invention addresses the foregoing problems by providing a wireless power transmitter and method of controlling the same to prevent overcurrent.

In accordance with an aspect of the present invention, a wireless power transmitter for transmitting charging power to a wireless power receiver is provided. The wireless power transmitter includes a power supply for supplying the charging power; a power transmitter for transmitting the charging power to the wireless power receiver; an overcurrent protection circuit for changing an impedance of the wireless power transmitter to prevent a current value of the charging power from exceeding a predetermined threshold; and a controller for determining whether the current value of the charging power is greater than the predetermined threshold and controlling to connect the overcurrent protection circuit to the power transmitter upon a determination that the current value of the charging power is greater than the predetermined threshold.

In accordance with another aspect of the present invention, a method of controlling a wireless power transmitter for transmitting charging power to a wireless power receiver is provided. The method includes applying the charging power to the wireless power receiver; determining whether a current value of the charging power is greater than a predetermined threshold; and driving the overcurrent protection circuit upon a determination that the current value of the charging power is greater than the predetermined threshold.

BRIEF DESCRIPTION OF THE DRAWINGS

The above and other features and advantages of the present invention will become more apparent by describing in detail embodiments thereof with reference to the attached drawings in which.

DETAILED DESCRIPTION OF EMBODIMENTS OF THE PRESENT INVENTION

Figure 1:
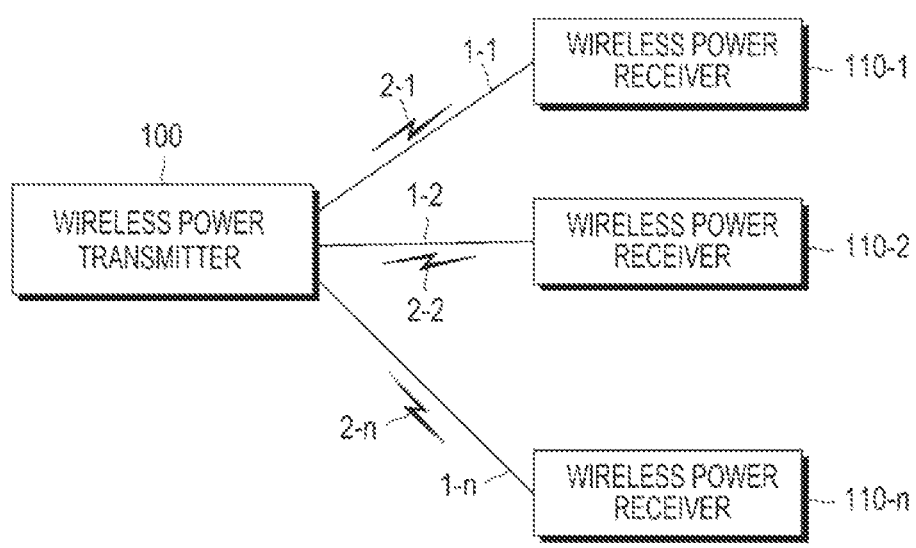
FIG. 1 is a diagram illustrating a wireless charging system according to an embodiment of the present invention.

Hereinafter, embodiments of the present invention are described with reference to the accompanying drawings. In the following description, the same elements may be designated by the same reference numerals although they are shown in different drawings. Further, various specific definitions found in the following description are provided only to help general understanding of the present invention, and it is apparent to those skilled in the art that the present invention can be implemented without such definitions. Further, in the following description of the present invention, a detailed description of known functions and configurations incorporated herein may be omitted when such a description may obscure the subject matter of the present invention.

FIG. 1 is a diagram illustrating a wireless charging system according to an embodiment of the present invention.

Referring to FIG. 1, the wireless charging system includes a wireless power transmitter 100 and wireless power receivers 110-1, 110-2, . . . , 110-$n$.

The wireless power transmitter 100 wirelessly transmits respective power 1-1, 1-2, . . . , 1-$n$ to the wireless power receivers 110-1, 110-2, . . . , 110-$n$. Specifically, the wireless power transmitter 100 wirelessly transmits the power 1-1, 1-2, . . . , 1-$n$ only to wireless power receivers authenticated via a predetermined authentication procedure.

The wireless power transmitter 100 establishes an electrical connection with at least one wireless power receiver from among the wireless power receivers 110-1, 110-2, . . . , 110-$n$. For example, the wireless power transmitter 100 transmits the wireless power to the wireless power receivers 110-1, 110-2, . . . , 110-$n$ in an electromagnetic waveform.

The wireless power transmitter 100 also performs bidirectional communication with the wireless power receivers 110-1, 110-2, . . . , 110-$n$. The wireless power transmitter 100 and the wireless power receiver 110-1, 110-2, . . . , 110-$n$ process and transmit/receive packets 201, 202, . . . , 2-$n$ consisting of certain frames, which are described in more detail herein below. The wireless power receivers may be implemented in mobile communication terminals, Personal Digital Assistants (PDAs), Portable Multimedia Players (PMPs), smartphones, etc.

The wireless power transmitter 100 wirelessly provides power to the plurality of the wireless power receivers 110-1, 110-2, . . . , 110-$n$. For example, the wireless power transmitter 100 may wirelessly transmit power to the plurality of the wireless power receivers 110-1, 110-2, . . . , 110-$n$ based on a resonance method. When the resonance method is adopted by the wireless power transmitter 100, a distance between the wireless power transmitter 100 and the plurality of the wireless power receivers 110-1, 110-2, . . . , 110-$n$ may be limited to a maximum of 30 m. However, when an electromagnetic induction method is adopted by the wireless power transmitter 100, a distance between the wireless power transmitter 100 and the plurality of the wireless power receivers 110-1, 110-2, . . . , 110-$n$ may be limited to a maximum of 10 cm.

The wireless power receivers 110-1, 110-2, . . . , 110-$n$ charge their batteries by receiving wireless power from the wireless power transmitter 100. The wireless power receivers 110-1, 110-2, . . . , 110-$n$ also transmit, to the wireless power transmitter 100, a signal for requesting the wireless power transmission, information necessary for wireless power reception, information indicating states of the wireless power receivers, and/or control information of the wireless power transmitter, which are described in more detail herein below.

The wireless power receivers 110-1, 110-2, . . . , 110-$n$ also each transmit a message indicating a respective charging state to the wireless power transmitter 100.

The wireless power transmitter 100 includes a display unit, and displays the respective states of each of the wireless power receivers 110-1, 110-2, . . . , 110-$n$ based on the respective messages received from the wireless power receivers 110-1, 110-2, . . . , 110-$n$. The wireless power transmitter 100 also displays an estimate of the time until completion of charging the respective wireless power receivers 110-1, 110-2, . . . , 110-$n$.

The wireless power transmitter 100 also transmits a control signal to each wireless power receiver 110-1, 110-2, . . . , 110-$n$ to disable its wireless charging function. When receiving the disable signal from the wireless power transmitter 100, the receiving wireless power receivers disable their own wireless charging functions.

Figure 2A:
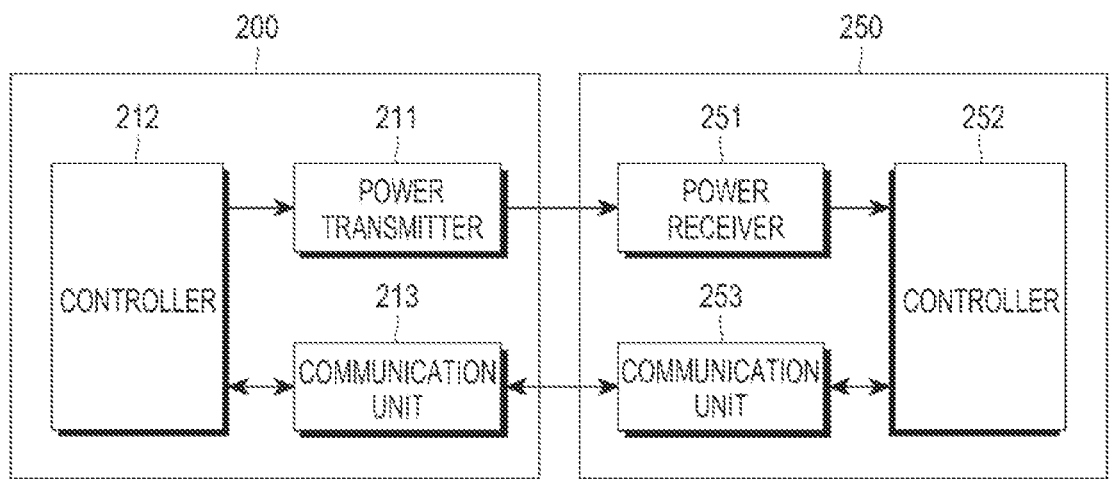
FIG. 2A is a block diagram illustrating a wireless power transmitter and a wireless power receiver according to an embodiment of the present invention.

FIG. 2A is a block diagram illustrating a wireless power transmitter and a wireless power receiver, according to an embodiment of the present invention.

Referring to FIG. 2A, the wireless power transmitter 200 includes a power transmitter 211, a controller 211, and a communication unit 213. The wireless power receiver 250 includes a power receiver 251, a controller 252, and a communication unit 253.

The power transmitter 211 provides power requested by the wireless power transmitter 200, and wirelessly transmits the requested power to the wireless power receiver 250. Here, the power transmitter 211 supplies the power in an Alternate Current (AC) waveform, or may convert the power in a Direct Current (DC) form into the AC waveform for supply by using an inverter. The power transmitter 211 may also be implemented in the form of a built-in battery or a power receiving interface for receiving power from an outside source and supplying the received power to other components in the wireless power transmitter 200. The power transmitter 211 is not limited to the above-described example, but may also be implemented in any other such device that provides power in an AC waveform in accordance with embodiments of the present invention.

In addition, the power transmitter 211 provides the AC waveform as electromagnetic waves to the wireless power receiver 250. The power transmitter 211 may also include a loop coil to transmit or receive the electromagnetic waves. When the power transmitter 211 includes a loop coil, an inductance L of the loop coil may be variable. The wireless transmitter 211 is not limited to the above-described examples, but may be implemented in any device for transmitting or receiving electromagnetic waves in accordance with embodiments of the present invention. The power transmitter 211 may also include a resonance circuit that includes a loop coil and a capacitor.

The controller 212 controls general operations of the wireless power transmitter 200. The controller 212 controls the general operations of the wireless power transmitter 200 by using a control algorithm, a program, or an application read from a storage (not shown). The controller 212 may be implemented in the form of a Central Processing Unit (CPU), a microprocessor, or a mini-computer.

The controller 212 also measures a current at a particular point of the wireless power transmitter 200. If the measured current is at least equal to a predetermined threshold, the controller 212 drives an overcurrent protection circuit, which is described in more detail herein below.

The communication unit 213 communicates with the wireless power receiver 250 through a predetermined communication method. The communication unit 213 may communicate with the communication unit 253 of the wireless power receiver 250 based on Near Field Communication (NFC), Bluetooth, Bluetooth Low Energy (BLE), Wifi, Wifi Direct, Zigbee communication, infrared communication, ultraviolet communication, etc. According to embodiments of the present invention, the communication unit 213 may use the Institute of Electrical and Electronics Engineers (IEEE) 802.15.4 Zigbee communication method. Furthermore, the communication unit 213 may use a Carrier Sense Multiple Access with Collision Avoidance (CSMA/CA) algorithm. Configurations for selecting a frequency and channel for use in the communication unit 213 are discussed in detail herein below. The foregoing communication methods used by the communication unit 213 are just provided as examples, and other communication methods may be used in accordance with embodiments of the present invention.

The communication unit 213 transmits a signal including information regarding the wireless power transmitter 200. Here, the communication unit 213 may unicast, multicast, or broadcast the signal. The communication unit 213 receives power information from the wireless power receiver 250. The power information includes at least one of a capacity of the wireless power receiver 250, remaining battery indicator, information indicating a frequency of charging, battery consumption, battery capacity, and a battery charge/consumption ratio, for example. The communication unit 213 transmits a charge function control signal to control a charging function of the wireless power receiver 250. The charge function control signal is used to enable or disable the charging function by controlling the power receiver 251 of the wireless power receiver 250.

The communication unit 213 may receive signals, not only from the wireless power receiver 250, but also from different wireless power transmitters (not shown). For example, the communication unit 213 may receive, from different wireless power transmitters, a signal for the wireless power transmitter 200.

In the wireless power transmitter 200 of FIG. 2A, the power transmitter 211 and the communication unit 213 are separate and use out-band communications, but embodiments of the present invention not limited thereto. The power transmitter 211 and the communication unit 213 may be integrated in a single hardware device, and thus the wireless power transmitter 200 may use in-band communications in accordance with embodiments of the present invention.

The wireless power transmitter 200 and the wireless power receiver 250 communicate various signals with each other, and accordingly subscription of the wireless power receiver 250 to a wireless power network hosted by the wireless power transmitter 200 and charging process through wireless power transmission and reception may be performed, which is described in detail herein below.

Figure 2B:
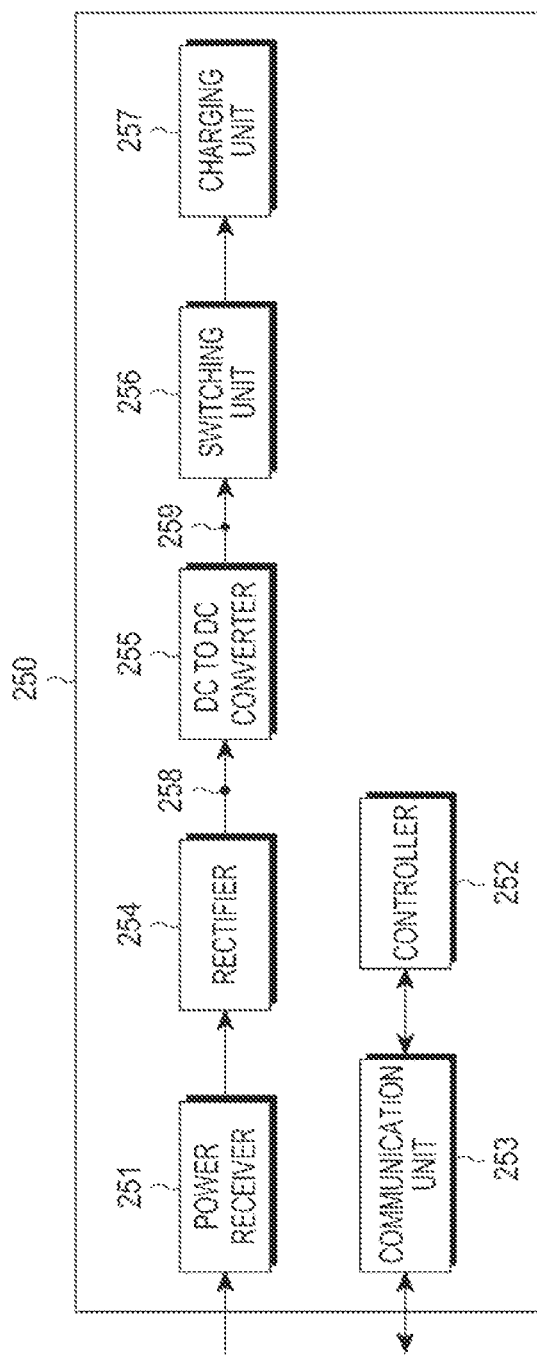
FIG. 2B is a block diagram illustrating a wireless power receiver according to an embodiment of the present invention.

FIG. 2B is a block diagram illustrating a wireless power receiver according to an embodiment of the present invention.

Referring to FIG. 2B, a wireless power receiver 250 includes a power receiver 251, a controller 252, a communication unit 253, a rectifier 254, a DC to DC converter 255, a switching unit 256, and a charging unit 257.

The power receiver 251, the controller 252 and the communication unit 253, operate in a manner similar to that described above with respect to corresponding components of FIG. 2A, and accordingly, a further description of these components is omitted for clarity and conciseness. The rectifier 254 rectifies the wireless power received by the power receiver 251 into a Direct Current (DC) format and may be implemented with bridge diodes, for example. The DC to DC converter 255 converts the rectified power to have a predetermined level. For example, the DC to DC converter 255 may convert the rectified voltage to 5V at its output end 259. However, minimum and maximum values of a voltage to be applied to the front end (input end) of the DC to DC converter 255 may be preset, and the values may be recorded in Input Voltage MIN and Input Voltage MAX fields of a request join signal, respectively, which are discussed in detail herein below. Rated voltage and rated current at the output end 259 of the DC to DC converter 255 may also be recorded in Typical Output Voltage and Typical Output Current fields of the Request join signal.

The switching unit 256 connects the DC to DC converter 255 to the charging unit 257. The switching unit 256 keeps an ON or OFF state under control of the controller 252. The charging unit 257 stores the converted power input from the DC to DC converter 255 when the switching unit 256 is in the ON state.

Figure 3:
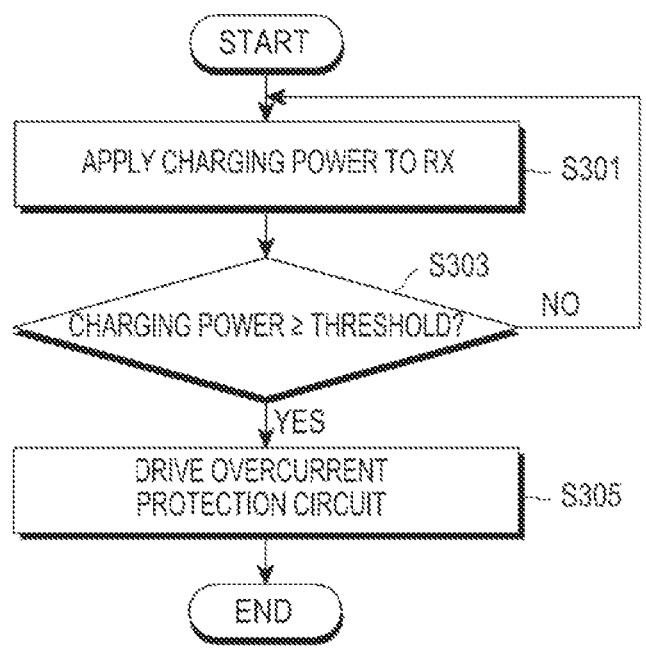
FIG. 3 is a flowchart illustrating a method of controlling a wireless power transmitter according to an embodiment of the present invention.

FIG. 3 is a flowchart illustrating method of controlling a wireless power transmitter according to an embodiment of the present invention.

Referring to FIG. 3, the wireless power transmitter 200 applies charging power to at least one wireless power receiver, in step S301. In this regard, the wireless power transmitter 200 applies a predetermined level of charging power to the at least one wireless power receiver.

The user may change the position of the wireless power receiver 250. The user may also arrange the wireless power receiver 250 on the wireless power transmitter 200. In such cases, impedance at a specified point of the wireless power transmitter 200 may rapidly change. In the process of changing the impedance at the specified point of the wireless power transmitter 200, an overcurrent may be applied to the wireless power transmitter 200. The wireless power transmitter 200 determines whether the applied charging power is greater than the predetermined threshold, in step S303.

If the applied charging power is less than the predetermined threshold, the wireless power transmitter 200 continues applying the current charging power, in step S301. However, if the applied charging power is at least equal to the predetermined threshold, the wireless power transmitter 200 drives the overcurrent protection circuit, in step S305.

The overcurrent protection circuit is described in more detail herein below. For example, the controller 212 controls a switch connected to the overcurrent protection circuit to be in an "ON" state, if the applied charging power is greater than the predetermined threshold. Meanwhile, the controller 212 controls the switch connected to the overcurrent protection circuit to be in an "OFF" state, if the applied charging power is less than the predetermined threshold.

The overcurrent protection circuit changes the impedance at the specified point of the wireless power transmitter 200, and thus ensures that the charging power applied from the wireless power transmitter is less than the predetermined threshold.

Figure 4A:
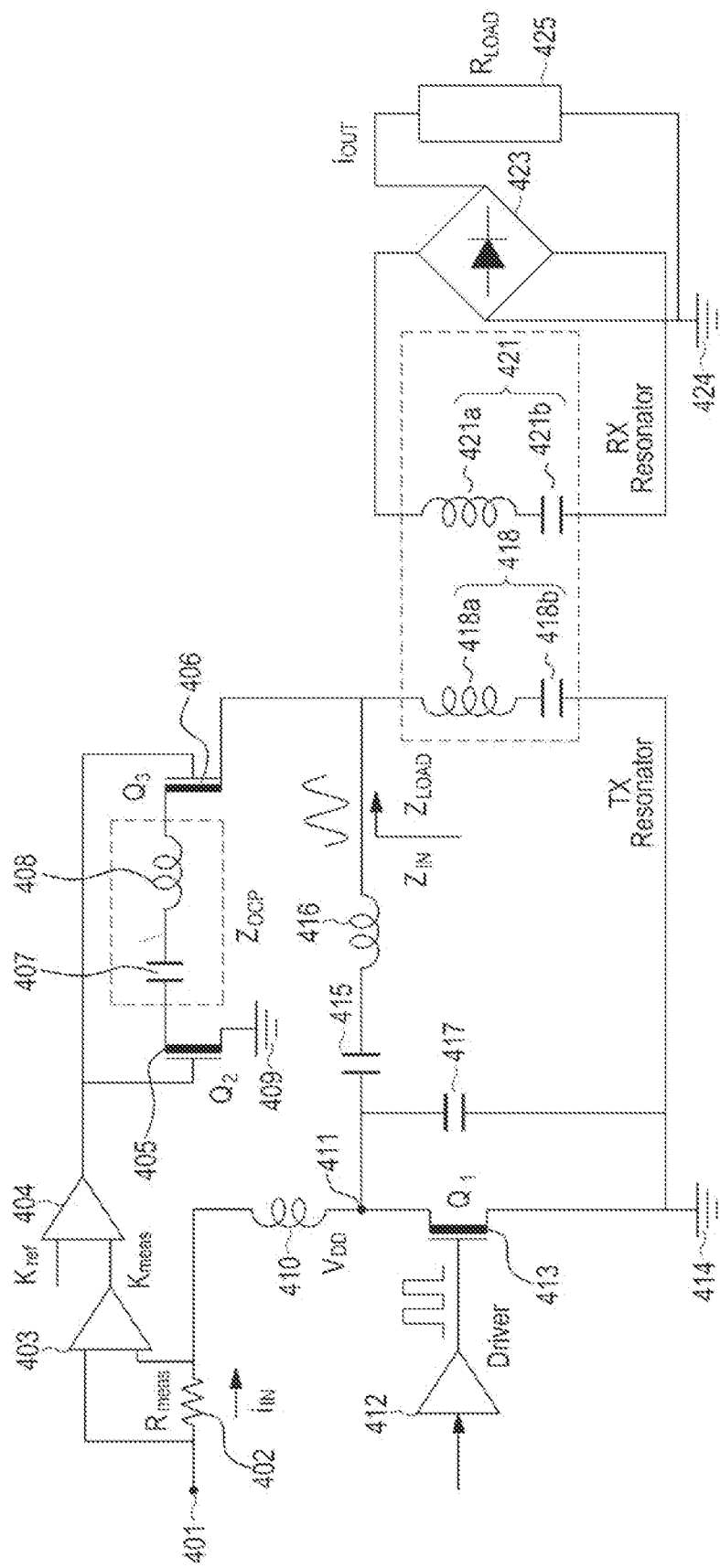
FIG. 4A is a circuit diagram illustrating a wireless power transmitter and a wireless power receiver according to an embodiment of the present invention.

FIG. 4A is a circuit diagram illustrating a wireless power transmitter and a wireless power receiver according to an embodiment of the present invention.

Referring to FIG. 4A, a wireless power transmitter includes a node 401. The node 401 is connected to a power supply (not shown) of the wireless power transmitter. The node 401 is also connected to a resistor 402 and a comparator 403. Inputs of the comparator are connected to front and rear ends of the resistor 402, respectively. An output of the comparator 403 is connected to an input of a comparator 404. Reference power $K_{ref}$ is applied to the other input of the comparator 404. An output of the comparator 404 is connected to the overcurrent protection circuit. The overcurrent protection circuit includes a first switch 405, a second switch 406, a capacitor 407, and a coil 408. The overcurrent protection circuit is connected to a ground 409 and a transmission resonator 418 that includes a coil 418a and a capacitor 418b. Specifically, the output of the comparator 404 is connected to both gates of the first switch 405 and second switch 406. The first switch 405 is connected to ground 409 and an end of the capacitor 407. The other end of the capacitor 407 is connected to an end of the coil 408. The second switch 406 is connected to the other end of the coil 408 and an end of the resonator 418.

In the meantime, the rear end of the resistor 402 and the one input of the comparator 403 are connected to an end of a coil 410. The other end of the coil 410 is connected to a node 411. The node 411 is connected to an end of a capacitor 415, an end of a capacitor 417, and a switch 413. A gate of the switch 413 is connected to an amplifier 412, which receives a drive signal. The switch 413 is also connected to ground 414. The other end of the capacitor 415 may be connected to an end of a coil 416. The other end of the capacitor 417 is connected to ground 414. The other end of the coil 416 is connected to an end of the resonator 418 and 419, the other end of which is connected to ground 414.

The wireless power receiver includes a resonator 421 and 422. The resonator 421 and 422 are connected to a rectifier 423, which in turn is connected to ground 424 and a load 425. The resonator 418 and 419 transmits the charging power to the resonator 421 and 422.

Although the embodiment of the present invention according to FIG. 4A uses a resonance method in which the transmission resonator 418 transmits the charging power to the reception resonator 421, embodiments of the present invention are not limited thereto. The transmission resonator 418 may be substituted with a coil, and the charging power may be transmitted in an electromagnetic induction method in accordance with embodiments of the present invention.

Impedance seen by the coil 416 of the wireless power transmitter is designated as $Z_{IN}$. The comparator 404 compares the magnitude of a current input from the wireless power supply with the magnitude of the reference power $K_{ref}$.

When the wireless power receiver is arranged in proximity to the wireless power transmitter, the impedance $Z_{IN}$ may change rapidly.

Figure 5A:
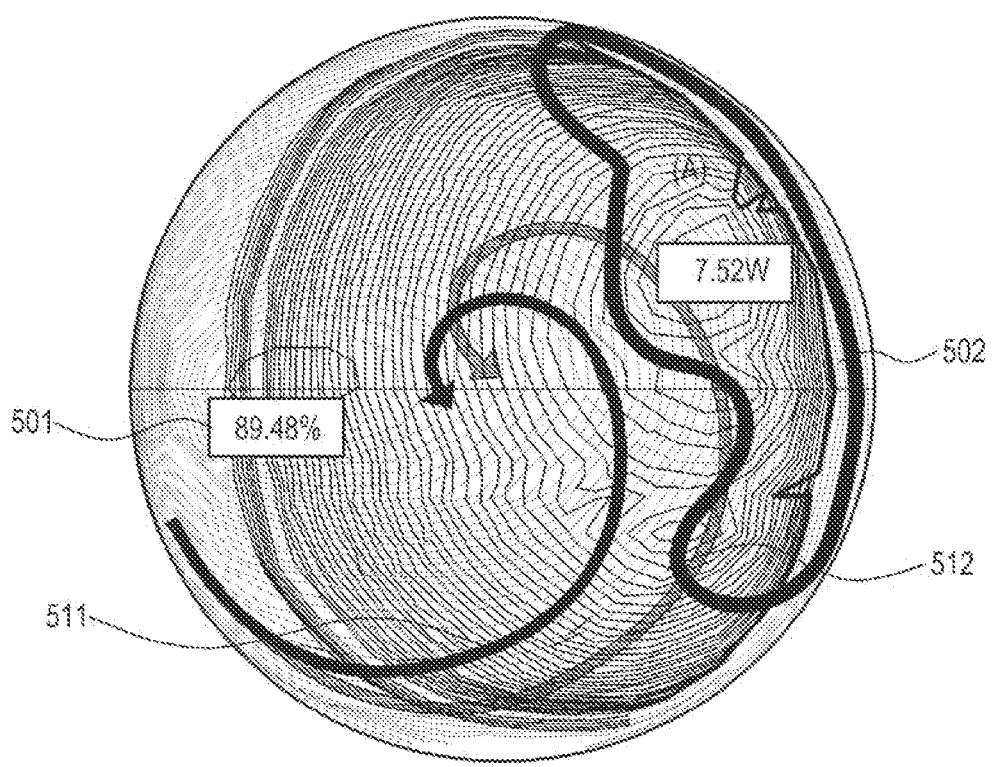
FIGS. 5A and 5B are Smith charts illustrating a change in impedance when a wireless power receiver is arranged according to an embodiment of the present invention.

FIG. 5A is a Smith chart illustrating a change in impedance when the wireless power receiver is arranged according to an embodiment of the present invention. The portion on the left of the Smith chart corresponds to a high efficiency/low power region 501.

When the impedance $Z_{IN}$ approaches the high efficiency/low power region 501, the amount of charging power applied from the wireless power transmitter to the wireless power receiver is relatively low while the charging efficiency is relatively high. The portion on the right of the Smith chart corresponds to a low efficiency/high power region 502. When the impedance $Z_{IN}$ approaches the low efficiency/high power region 502, the amount of charging power applied from the wireless power transmitter to the wireless power receiver is relatively high while the charging efficiency is relatively low. When the wireless power receiver is arranged in proximity to the wireless power transmitter, the impedance $Z_{IN}$ changes along with a trace 511 or 512.

When the impedance $Z_{IN}$ changes along with the trace 511, the impedance may avoid passing through the low efficiency/high power region 502. In this case, the application of charging power from the wireless power supply (not shown) of the wireless power transmitter may be stable without causing the overcurrent. However, when the impedance $Z_{IN}$ changes along with the trace 512, the impedance passes through the low efficiency/high power region 502. In this case, the charging power from the wireless power supply (not shown) of the wireless power transmitter may be higher than a predetermined threshold, thus causing various problems (e.g., causing a fire that destroys the amplifier).

The comparator 404 compares the charging power with the reference power $K_{ref}$, and connects the overcurrent protection circuit to the resonator 418 and 419 if the charging power is greater than the reference power. For example, the comparator 404 outputs a signal to control the first and second switches 405 and 406 to be in the "ON" state when the charging power is greater than the reference power.

Figure 5B:
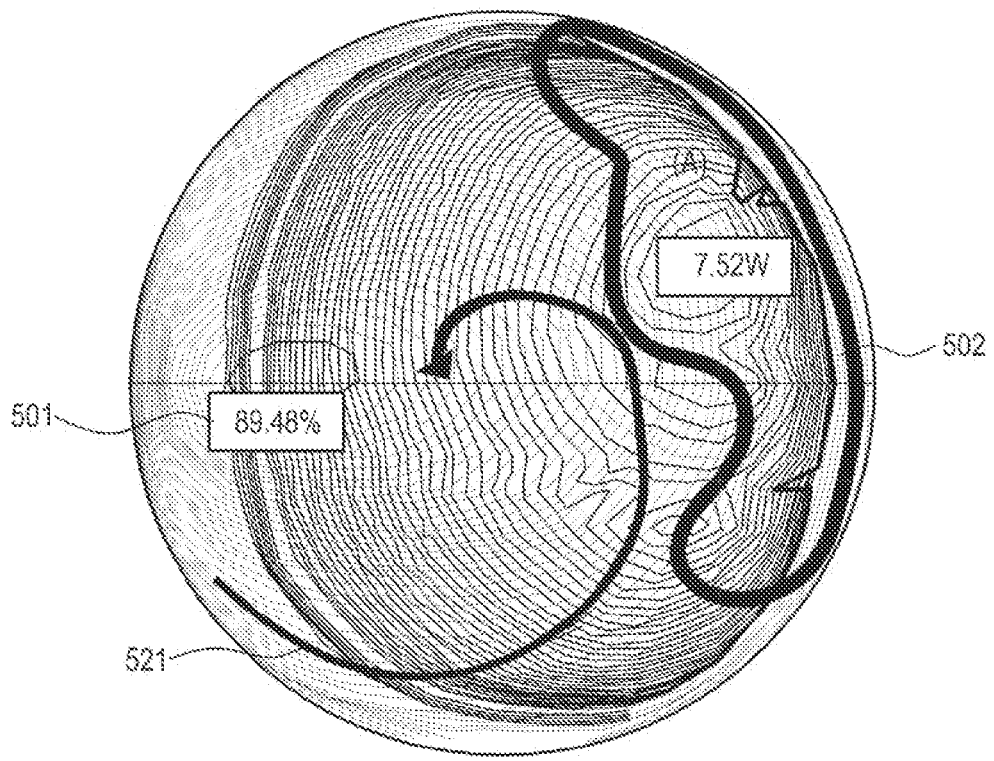

When the overcurrent protection circuit is connected to the resonator 418 and 419, the impedance $Z_{IN}$ may change. FIG. 5B is a Smith chart illustrating a case in which the change in the impedance after the connection of the overcurrent protection circuit according to an embodiment of the present invention. Referring to FIG. 5B, when the overcurrent protection circuit is connected, the impedance $Z_{IN}$ changes along with a trace 521.

In this case, the impedance $Z_{IN}$ does not pass through the low efficiency/high power region 502. Accordingly, the charging power applied from the power supply (not shown) of the wireless power transmitter is kept below a predetermined threshold.

Referring back to FIG. 4A, the overcurrent protection circuit includes the capacitor 407 and the coil 408, but embodiments of the present invention are not limited to this example. The overcurrent protection circuit may alternatively include at least one of a capacitor, a coil, and a resistor in accordance with embodiments of the present invention.

Figure 4B:
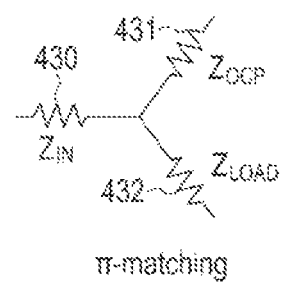
FIG. 4B is a diagram illustrating a circuit according to an embodiment of the present invention.

FIG. 4B is a diagram illustrating a circuit according to an embodiment of the present invention.

Referring to FIG. 4B, if the overcurrent protection circuit is connected, the wireless power transmitter, overcurrent protection circuit, and wireless power receiver includes a circuit equivalent to that illustrating in FIG. 4B, including $Z_{IN}$, $Z_{OCP}$ and $Z_{LOAD}$. Here, $Z_{OCP}$ is impedance of the overcurrent protection circuit and $Z_{LOAD}$ is impedance of the load 425. However, if the overcurrent protection circuit is not connected, the wireless power transmitter and wireless power receiver include a circuit equivalent to a circuit in which $Z_{IN}$ and $Z_{LOAD}$ is connected in series, for example (not shown).

As described above, if the charging power is greater than the predetermined threshold, the overcurrent protection circuit is connected to change the impedance. With the impedance change, the impedance is not contained in the low efficient high power region 502, thus preventing an overcurrent from being applied.

Figure 6:
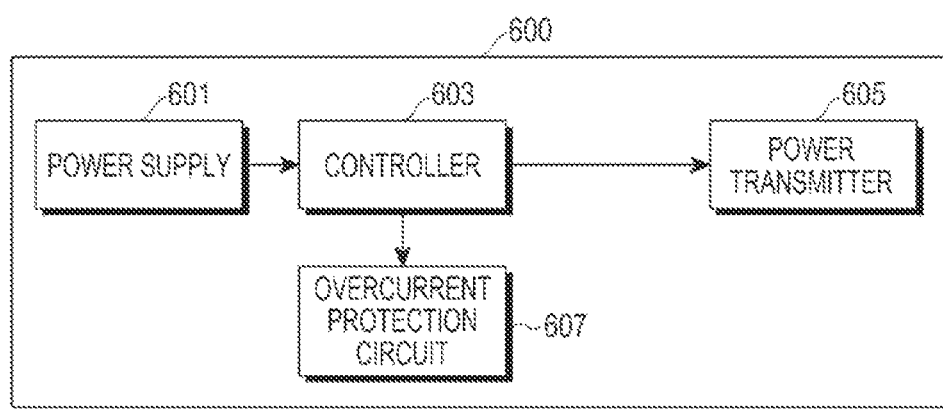
FIG. 6 is a block diagram illustrating a wireless power transmitter according to an embodiment of the present invention.

FIG. 6 is a block diagram illustrating a wireless power transmitter according to an embodiment of the present invention.

Referring to FIG. 6, a wireless power transmitter 600 includes a power supply 601, a controller 603, a power transmitter 605, and an overcurrent protection circuit 607. The power supply 601 supplies charging power.

The power transmitter 605 transmits charging power to a wireless power receiver. The overcurrent protection circuit 607 changes impedance in the wireless power receiver at a specified point, in order to prevent a current of the charging power from increasing beyond a predetermined threshold. The controller 603 determines whether the charging power is greater than the predetermined threshold, and if so, the controller 603 controls connection of the overcurrent protection circuit 607 to the power transmitter 605.

The overcurrent protection circuit 607 includes at least one of a capacitor, a coil, and a resistor. The overcurrent protection circuit 607 may further include a first switch (not shown) to connect between the controller 603 and the overcurrent protection circuit 607 and a second switch (not shown) to connect between the overcurrent protection circuit 607 and the power transmitter 605.

The controller 603 controls the first and second switches to be in the "ON" state if the charging power is greater than the predetermined threshold.

The controller 603 may also include a comparator (not shown) connected to the power supply 601. A first input of the comparator receives the charging power from the power transmitter 601 and a second input of the comparator receives the reference power. The comparator compares input values of the first and second inputs, and outputs a value based on the comparison. For example, if the input value of the first input is greater than that of the second input, the comparator outputs a control signal to control the first and second switches to be set to the "ON" state.

At least one element of the overcurrent protection circuit 607 (i.e., at least one of the capacitor, the coil, and the resistor) is configured to have impedance at a specified point of the wireless power transmitter to be outside of the low efficiency/high power region.

The controller 603 connects the overcurrent protection circuit 607 to the power transmitter 605 based on a charging related signal received from the wireless power receiver. The wireless power transmitter may further include a communication unit (not shown) for receiving the charging related signal from the wireless power receiver. The controller 603 analyzes the received charging related signal to determine whether the overcurrent is applied to the wireless power receiver or whether the impedance belongs to the low efficiency/high power region.

According to embodiments of the present invention, overcurrent caused by a rapid change in impedance may be prevented. Accordingly, unstable operations of an amplifier or destruction of a power supply by fire may be prevented. The change in impedance at a specified point of a wireless power transmitter may be controlled such that it does not to pass through a low efficiency/high power region, thereby preventing the application of overcurrent.

The controller 603 may connect the overcurrent protection circuit 607 to the power transmitter 605 if the overcurrent is applied to the wireless power receiver or the impedance belongs to the low efficiency/high power region.

While the invention has been shown and described with reference to certain embodiments thereof, it will be understood by those skilled in the art that various changes in form and details may be made therein without departing from the spirit and scope of the invention as defined by the appended claims.

What is claimed is:

1. A wireless power transmitter for transmitting charging power to a wireless power receiver, the wireless power transmitter comprising:
   a power supply for supplying the charging power;
   a power transmitter for transmitting the charging power to the wireless power receiver;
   an overcurrent protection circuit for changing an impedance of the wireless power transmitter to prevent a current value of the charging power from exceeding a predetermined threshold; and
   a controller for determining whether the current value of the charging power is greater than the predetermined threshold and controlling to connect the overcurrent protection circuit to the power transmitter upon a determination that the current value of the charging power is greater than the predetermined threshold.

2. The wireless power transmitter of claim 1, wherein the overcurrent protection circuit includes at least one element of a capacitor, a coil, and a resistor.

3. The wireless power transmitter of claim 2, wherein the overcurrent protection circuit further includes a first switch connected between the controller and the overcurrent protection circuit and a second switch connected between the overcurrent protection circuit and the power transmitter.

4. The wireless power transmitter of claim 3, wherein the controller controls the first and second switches to be in an "ON" state if the current value of the charging power is greater than the predetermined threshold.

5. The wireless power transmitter of claim 4, wherein the controller includes a comparator connected to the power supply.

6. The wireless power transmitter of claim 5, wherein a first input of the comparator receives the charging power from the power supply, and a second input of the comparator receives a reference power having the predetermined threshold.

7. The wireless power transmitter of claim 6, wherein the comparator compares input values from the first and second inputs and outputs a value according to a result of the comparison.

8. The wireless power transmitter of claim 7, wherein the comparator outputs a control signal to control the first and second switches to be in the "ON" state if the input value of the first input is greater than the input value of the second input.

9. The wireless power transmitter of claim 2, wherein the at least one element of the capacitor, coil, and resistor prevents impedance at a specified point of the wireless power transmitter from entering a low efficiency/high power state.

10. The wireless power transmitter of claim 1, further comprising a communication unit for receiving a charging related signal from the wireless power receiver,
    wherein the controller determines whether to connect the overcurrent protection circuit to the power transmitter by analyzing the charging related signal.

11. A method of controlling a wireless power transmitter for transmitting charging power to a wireless power receiver, the method comprising:

applying the charging power to the wireless power receiver;

determining whether a current value of the charging power is greater than a predetermined threshold; and connecting the overcurrent protection circuit to the wireless power transmitter upon a determination that the current value of the charging power is greater than the predetermined threshold; and wherein connecting the overcurrent protection circuit includes controlling the charging power to be less than the predetermined threshold by changing an impedance of the wireless power receiver.

* * * * *